A. E. COOK & T. VAN TUYL.
TRACTOR.
APPLICATION FILED AUG. 15, 1912. RENEWED SEPT. 8, 1916.

1,202,365.

Patented Oct. 24, 1916.
5 SHEETS—SHEET 1.

A. E. COOK & T. VAN TUYL.
TRACTOR.
APPLICATION FILED AUG. 15, 1912. RENEWED SEPT. 8, 1916.

1,202,365.

Patented Oct. 24, 1916.
5 SHEETS—SHEET 5.

UNITED STATES PATENT OFFICE.

ALBERT E. COOK, OF ODEBOLT, IOWA, AND THOMAS VAN TUYL, OF KANKAKEE, ILLINOIS; SAID VAN TUYL ASSIGNOR TO SAID COOK.

TRACTOR.

1,202,365.     Specification of Letters Patent.     Patented Oct. 24, 1916.

Application filed August 15, 1912, Serial No. 715,190. Renewed September 8, 1916. Serial No. 119,138.

*To all whom it may concern:*

Be it known that we, ALBERT E. COOK and THOMAS VAN TUYL, citizens of the United States, and residents of the city of Odebolt, county of Sac, and State of Iowa, and Kankakee, Kankakee county, Illinois, respectively, have invented certain new and useful Improvements in Tractors; and we do hereby declare that the following is a full, clear, and exact description of the same, reference being had to the accompanying drawings, and to the numbers of reference marked thereon, which form a part of this specification.

This invention relates to improvements in tractors, of that class set forth in our prior Letters Patent, Nos. 1,180,475 and 1,180,476, granted April 25, 1916.

The object of this invention is to afford a construction facilitating the connection of an automobile with the tractor, and to afford in connection therewith means whereby the drive from the power plant of the automobile is communicated direct to the driving means for the tractor without propelling the automobile's rear driving wheels.

It is also an object of the invention to afford a construction affording means for attaching and detaching the power plant with the tractor with the least possible loss of time, and to afford means whereby both the tractor and the vehicle carrying the power plant may be utilized for carrying a load.

It is an object of the invention also to afford a construction whereby the tractor may be utilized to support a load thereon with means for adjusting the load relatively to a horizontal plane.

It is an object of the invention also to afford a construction whereby a worm gear drive is utilized in delivering the power to the tractor, and wherein means are employed for quickly detaching and also quickly reëngaging the driving shaft to drive either the automobile or the tractor each independently of the other.

It is an object of the invention also to afford a device of the class described in which the weight of the rear end of the automobile is carried upon the tractor, and in which means are provided for quickly connecting the automobile in place to drive the tractor and thereby itself or quickly release the same from driving engagement with the tractor.

It is a further object of the invention to afford a construction wherein maximum efficiency of drive is assured at any of several different speeds.

The invention (in a preferred form) is illustrated in the drawings, and hereinafter more fully described.

Figure 1:
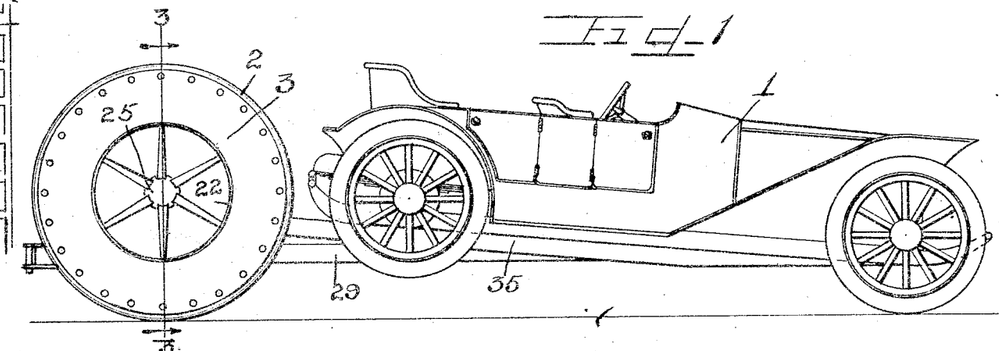
Figure 1 is a side elevation of a device embodying my invention, showing the automobile power plant connected with the tractor.
Figure 2:
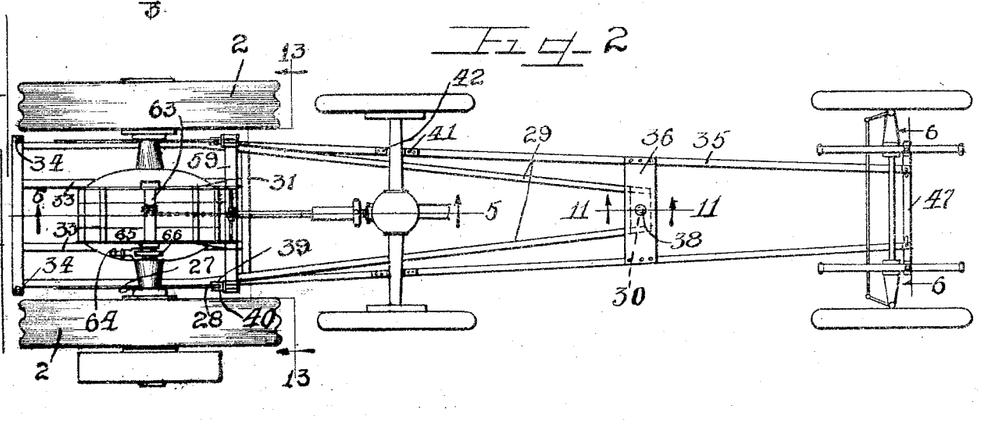
Fig. 2 is a top plan view with the body of the automobile vehicle removed.
Figure 14:
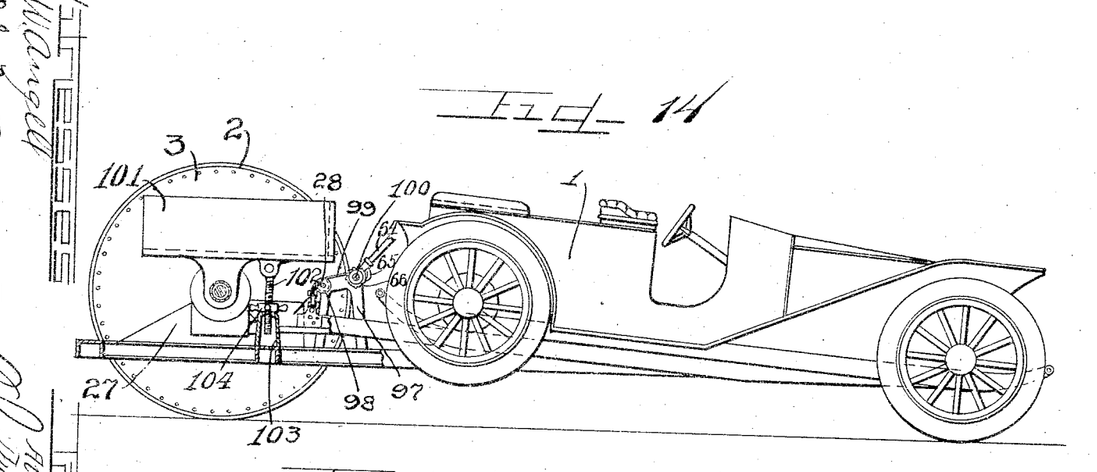
Fig. 14 is a side elevation similar to Fig. 1, and with the tractor partly in section, and illustrating a load pivotally supported upon the tractor frame.
Figure 15:
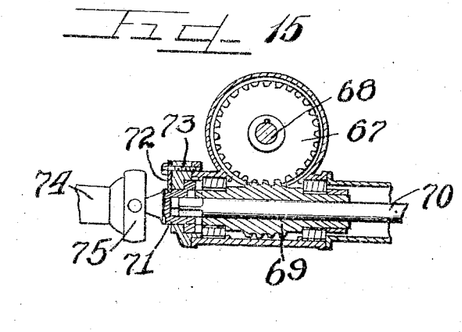
Fig. 15 is an enlarged, fragmentary section of the worm gear drive for the automobile showing the clutch therefor disengaged to permit the drive to be delivered to the tractor instead of the automobile wheels.
Figure 16:
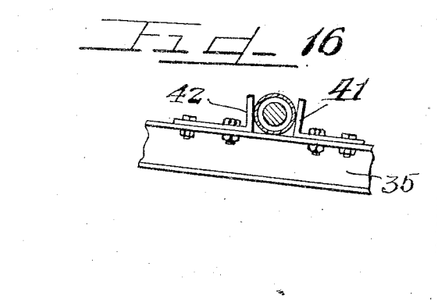
Fig. 16 is an enlarged fragmentary detail of the means for engaging the rear axle of the automobile on the tractor frame.

As shown in the drawings, 1, indicates an automobile vehicle of any desired kind, and equipped, of course, with a suitable power plant, and, as shown, connected to drive said automobile vehicle and adapted for connection to drive the auxiliary tractor when said automobile vehicle is partly supported thereon, as shown in Figs. 1, 2 and 14.

Figure 3:
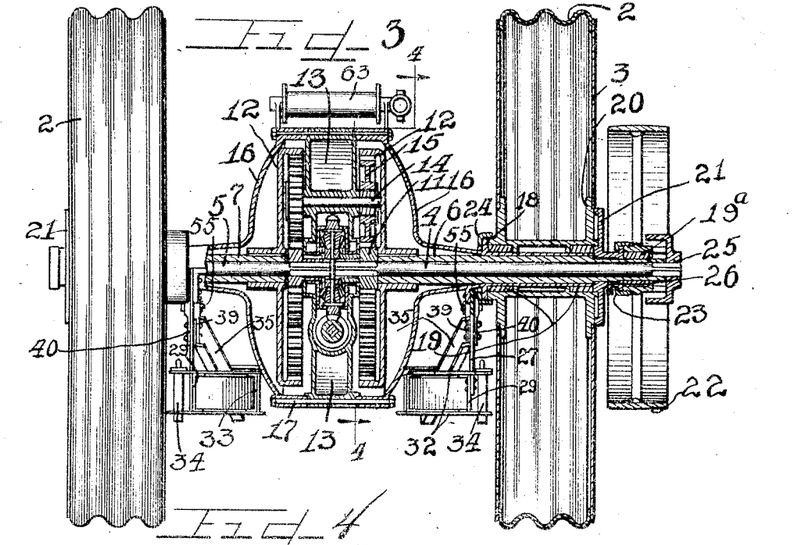
Fig. 3 is an enlarged section on line 3—3 of Fig. 1, with one of the tractor wheels shown in elevation.
Figure 5:
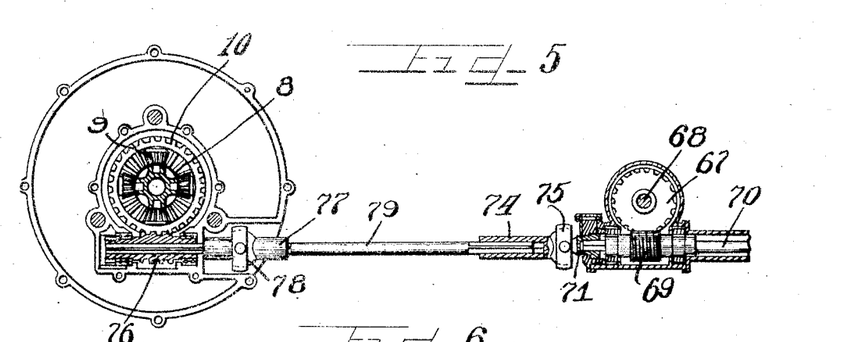
Fig. 5 is an enlarged section on line 5—5 of Fig. 2.
Figures 6, 7, 8, 9, 10:
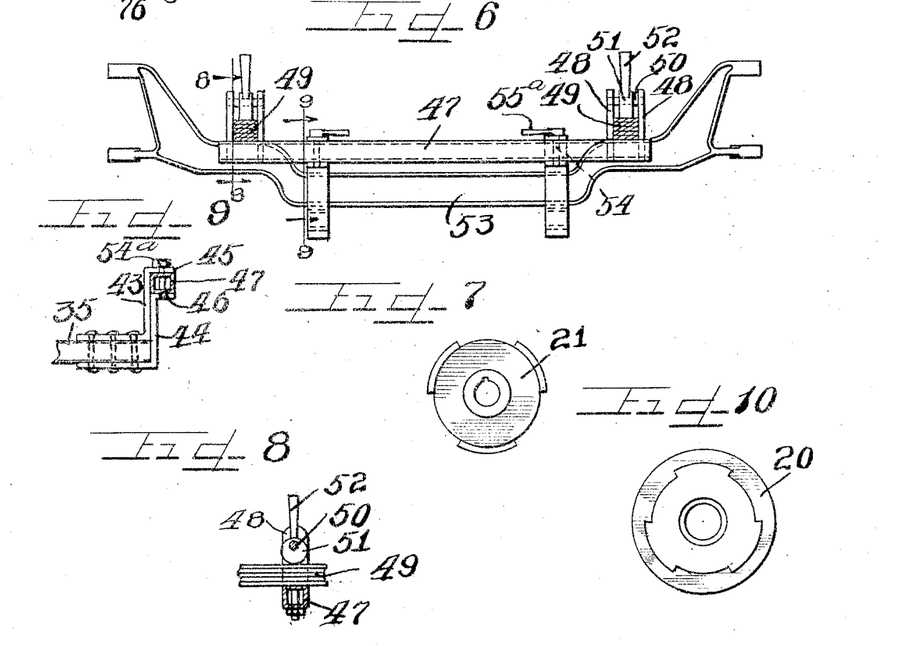
Fig. 6 is an enlarged section on line 6—6 of Fig. 2.
Fig. 7 is an enlarged detail view of one of the tractor wheel clutch members.
Fig. 8 is a fragmentary detail of one of the attaching clamps for engaging the front end of the tractor frame with the front axle of the automobile power plant.
Fig. 9 is an enlarged detail of the means for engaging said end of the tractor frame in place.
Fig. 10 is a face view of the other tractor wheel clutch member.
Figure 12:
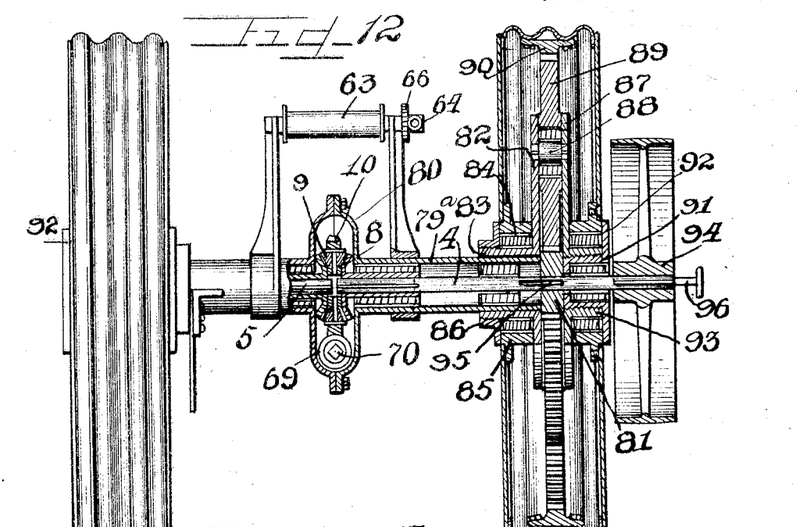
Fig. 12 is an enlarged fragmentary detail similar to Fig. 3, and with parts omitted, illustrating the construction wherein the drive is partly contained within the tractor wheels.
Figure 13:
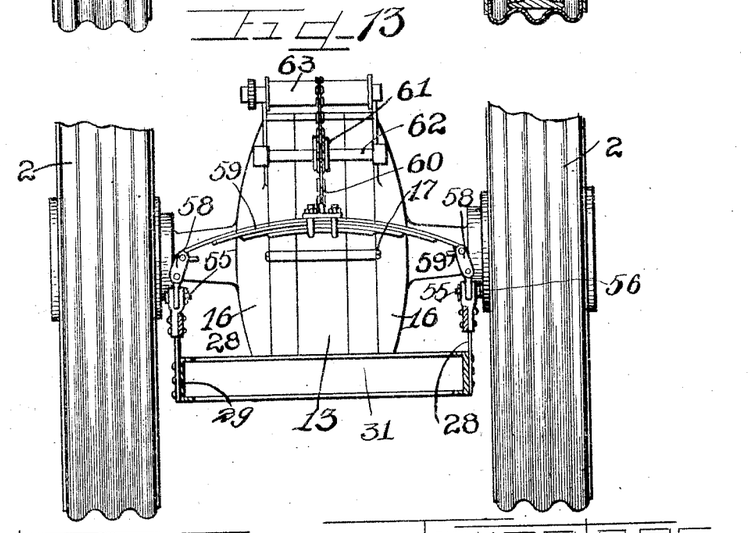
Fig. 13 is an enlarged section on line 13—13 of Fig. 2.

The wheels 2, of the two wheeled tractor, are provided with peripherally corrugated rims, and inwardly turned lateral flanges, and secured on said flanges at the rim and at its hubs, are metallic plates 3, affording a closed dirt and waterproof wheel. In the construction illustrated in Figs. 1 to 4 inclusive, and 13, the axle for said tractor wheels comprises shaft sections 4 and 5, arranged in alinement, and journaled on which are hollow shafts or sleeve sections 6 and 7. Said solid shaft sections at their adjacent or inner ends, which nearly abut, are each provided with a bevel gear 8, rigidly secured thereon, which face inwardly and engage therebetween, and mesh with bevel pinions 9, which are journaled radially within a worm gear 10, as shown in Figs. 3, 5, and 12. Rigidly secured on each of said shaft sections 4 and 5, at the inner end thereof, is a pinion 11, adjacent the respective inner ends of the tubular shaft sections 6 and 7, and rigidly engaged on the inner end of said tubular shaft sections 6 and 7, are inwardly facing internal gear wheels 12. Extending between said gear wheels 12, and inclosing said differential, is a casing or frame 13, having secured therein shafts 14, as shown three in number, and equally spaced about and parallel with the shaft sections 4 and 5. Journaled on the extended ends of said shafts 14, by means affording a roller (or other anti-friction bearing) are spur gear wheels 15, intermeshing the pinions 11, and the internal gears 12, and acting to transmit the drive of the shaft sections 4 and 5, to the tubular shaft sections 6 and 7, through the medium of said gear wheels. Inclosing the differential and transmission described, is a casing or housing 16, constructed as shown in Figs. 3 and 13, of equal and like pressed or cast steel sections, adapted to receive between the inner edges thereof, and to finish flush with the periphery of the casing 13, and as shown, rigidly secured thereto and to each other by means of bolts 17, extending therethrough, and any desired number of which may be provided around the periphery of said casing. Said casing sections each taper outwardly to the tubular shaft sections 6 and 7, adjacent the inner side of the wheel and are provided thereon with integral collars 18, adapted to afford a stop for the inner end of the wheel hub. Said casing beyond said collar, fits closely to the tubular shaft and extends to near the outer end of the wheel hub and affords a non-rotative journal for the wheel. The hub of each of said wheels is preferably cored or otherwise shaped to afford recesses in each end thereof to receive the roller bearings 19, which engage in said hub and bear on the extended journal portion of said casing. Each of said wheel hubs at its outer end is provided with an outwardly facing clutch member 20, as shown in Figs. 3 and 10, and slidably secured near the outer end of each of the tubular shaft sections, is a complemental clutch member 21, adapted to engage therewith to drive the tractor wheel through the rotation of said tubular shaft sections.

Journaled upon the outer end of one of the tubular shaft sections, and abutting against the hub of the clutch member 21, is a belt pulley 22, the hub of which is provided with a roller or other anti-friction bearing 19ª. As shown, the inner end of the hub of said pulley is externally threaded to receive the flanged nut 23, the flange of which engages over an outer peripheral collar on the hub of the clutch member 21. As shown also, a flanged nut 24, is threaded on the inner end of each tractor wheel hub and engages over the collar 18, on the casing to hold the wheel from longitudinal movement on the shaft or axle.

Slidably keyed on the outer end of the solid shaft section 4 is a prong clutch 25, the prongs or fingers of which are directed inwardly to receive the hub of the belt pulley 22, therebetween, and to engage the spider of said pulley to drive the same from the inner or solid shaft when the clutch member 21, and said belt pulley are slipped longitudinally on the tubular shaft to permit disengagement of the clutch member 21, from its complemental member, thus permitting the belt pulley to be driven independently when desired. A set screw 26, is provided on the hub of said clutch member 21, to engage the same from longitudinal movement on its tubular shaft when engaged to drive the tractor wheel, or when moved outwardly to release the tractor wheel from the drive thereof.

An integral web or bracket is provided on the cast or pressed metal housing adjacent the flanged nut 24, and rigidly bolted thereto and depending therefrom, one on each side the machine and adjacent the inner side the wheel, is a supporting web 27, of steel or other suitable material. Said plate extends downwardly a sufficient distance below the axle and rearwardly therefrom, to afford a supporting web for the tractor frame or platform and extends forwardly to a point in advance of the casing or housing 16, for the transmission and differential, and at its forward end affords a vertical guide web 28, one at each side of the machine. Riveted or otherwise secured to the lower edge of said plate, and extending horizontally beneath the axle, are side sills 29, of the tractor frame, which are parallel to near the front or guide end 28, of said plates 27, and thence converge toward a point well in advance of the tractor wheels. The forward ends of said sills 29, are provided with a concave saddle 30, on the upper face thereof, which is rigidly secured thereto and serves to rigidly engage said ends of the sills together.

A transverse beam 31, is engaged between the tractor frame sills 29, in advance of the axle, and a suitable beam 32, is engaged to the rear ends of said sills and supported on said transverse sills 31, and 32, are longitudinal parallel sills 33, which may, if preferred, be channel bars, and upon which a suitable platform may be laid. As shown, traction or coupling pins 34, are provided in the ends of the rear transverse sill member 32, one at each side the frame.

Figures 4, 11:
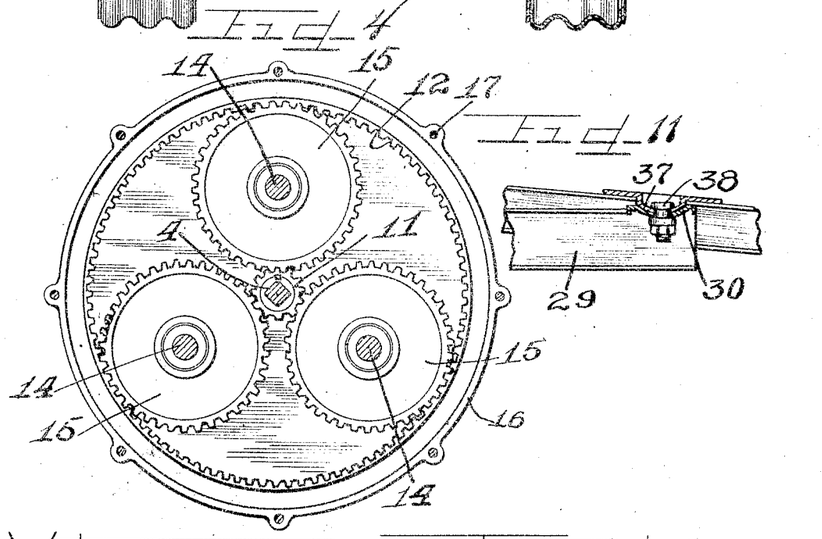
Fig. 4 is an enlarged section on line 4—4 of Fig. 3.
Fig. 11 is an enlarged fragmentary section on line 11—11 of Fig. 2.

A hoisting or elevating frame comprising sills 35, provided with a transverse beam 36, near the middle thereof, and having a downwardly facing convex knuckle 37, at the middle thereof complemental with the spherically concave socket in the saddle 30, and fitting therein is engaged by means of a pivot bolt 38, as shown in Figs. 2 and 11, to permit said hoisting frame to oscillate in any direction on the ball and socket joint afforded thereby. The sills of the hoisting frame may be of any desired length and overlie at their rear ends the sills 29, of the tractor frame, and rigidly secured on the rear end of each are parallel guide plates 39 and 40, which receive the guide end 28, of the supporting plate 27, therebetween, to permit the one to slide upon the other.

Secured on each of the sills 35, of the hoisting frame, at a point to receive the rear axle of the automobile or truck therebetween, are brackets 41 and 42. Said brackets are preferably engaged in place by means of bolts inserted through slots in the sills whereby the same may be adjusted on the sills to suit the automobile or truck which furnishes the power and steering means for the tractor. The forward end of each of the sills 35, of the hoisting frame has secured thereon upper and lower brackets 43 and 44, which at their upper ends are directed forwardly to afford clamping jaws 45 and 46, adapted to engage therebetween a transverse bar 47, each end of which is provided with parallel upwardly directed arms 48. Said bar 47, is supported on the automobile or truck on the springs 49, therefor, as shown in Figs. 2 and 6, said arms 48, extending upwardly on each side the spring and pintle 50, extending therethrough, having secured thereon an eccentric 51, provided with a lever or tail 52, whereby the bar may be clamped rigidly on said springs closely adjacent the front axle 53, of the car. The clamping jaws at the front end of the sills 35, receive the bar 47, therebetween, and a bolt 54, extends upwardly through said clamping jaws and bar, and a levered nut 54$^a$ is provided on each of said bolts to rigidly engage the same in place.

As shown, a shackle bolt 55, extends through suitable lugs in the guide plates or webs 39 and 40, and engaged thereon is a shackle 56, having a bolt extending therethrough and on which engage links 58, the upper ends of which are pivotally engaged on a leaf spring 59, which extends transversely the machine just in advance of the transmission housing or casing. A hoisting chain 60, is suitably secured at the middle of said spring 59, and leads upwardly over a sheave 61, rotatably and slidably mounted upon a shaft 62, secured transversely said housing, and thence leads to a winch 63, provided in any suitable manner with a lever 64, for operating the same, and pawl and ratchet 65 and 66. By means of said winch the rear end of the automobile may be quickly lifted to a desired height from the ground, as shown in Figs. 1 and 14.

In the construction shown, the automobile is driven by a worm gear 67, secured on the rear shaft 68, thereof, and meshing with a worm 69, journaled in a suitable casing supported on said axle to hold the worm 69, at all times in mesh with the worm gear, and through which the engine or driving shaft 70, extends, and is engaged to drive said worm through the medium of a clutch, one member of which is afforded by suitably shaping the rear end of the worm 69, and the other member 71, of which slidably engages on the angular end of the drive shaft 70, and may be slipped into or out of engagement with said end of the worm to drive said worm and thereby the automobile. As shown, a split key 72, is slidably engaged by a suitable bolt 73, secured in a part of the casing for said worm gear and worm, and is adapted to engage in a suitable recess in the clutch member 71, to hold the clutch member in engagement or when said clutch member 71, is retracted to hold the same out of engagement, thus permitting the shaft 70, to revolve without turning said worm 69. At the rear end of said clutch member 71, a shaft 74, is coupled by means of a universal joint 75, and journaled in the frame 13, on the tractor, is a worm 76, which meshes with the worm gear and drives through the differential in said housing, and at its forward end coupled with the shaft section 77, having an angular bore therein similar to the bore in the shaft section 74, by a universal joint 78, and a shaft 79, provided with angular ends, slidably engages in the tubular shaft section 74, and in the tubular shaft section 78, to communicate the drive from the engine shaft direct to the tractor when properly coupled and when the clutch member 71, is retracted without driving the automobile wheels.

In the construction illustrated in Fig. 12, the differential before described, is connected to drive the shaft sections 4 and 5, and, as shown, a sleeve 79, of relatively large size surrounds said shaft sections, and is integrally (or otherwise suitably) connected with a relatively small housing 80, affording the differential casing, and in the bottom of which is journaled a worm 76, as before described. Secured on said shaft sections 4 and 5, in each of the tractor wheels, is a pinion 81, and rigidly secured on the end of the sleeve 79, of the housing, and facing outwardly from the extremity thereof, is a collar 82, having a relatively long cylindric hub 83, thereon, upon which the roller bearings 84, for the inner end of the hub 85, of said wheel roll. A collar 86, is threaded on the hub of said collar 82, and bears against the inner end of the wheel hub, as shown in Fig. 12.

Journaled on shafts 88, extending between the collar 82, and the collar 87, are gear wheels 89, as shown three in number, which mesh with the pinion 81, on the shaft sections 4 and 5, and also mesh with an annular gear 90, secured centrally in the rim of each wheel. A housing 91, provided with a flange 92, at its outer end, is engaged over the outer end of the shaft sections 4 and 5, and contains the roller bearings for the outer ends of said shaft sections, and also threads into the internally threaded hub 93, of said collar 87. As shown, roller bearings are provided for the outer side of the wheel, inclosed between the hub of said collar 87, and the hub of the wheel. A driving pulley 94, is secured on the outer end of the shaft section 4, and the key 95, whereby the said pinion 81, is engaged on said shaft, is connected through a suitable bore in said shaft section with a rod 96, whereby the key may be retracted to permit said pulley only to be driven when desired.

The tractor frame and the elevator frame are constructed and are supported upon the casing or sleeve 79, of the axle, as before described, and the winch 63, is mounted upon suitable standards on said sleeve and housing 79 and 80, to permit the elevator frame to be raised or lowered as desired. In the construction illustrated in Fig. 14, the tractor wheels are constructed as described with reference to Fig. 12, and the axle and the housing therefor are also shown constructed as shown in Fig. 12, provided with a differential, although, of course, the transmission may be carried upon the shaft and axle, as shown in Figs. 2, 3, and 13, if preferred. In said figures the tractor frame is constructed substantially as before described, and the elevator frame is supported thereon, and a suitable frame or bracket 97, is mounted upon the tractor frame and provided with a sheave 98, journaled to rotate and to slide on a suitable horizontal shaft on said frame, and thence the chain or cable 99, is led about the winch 100, which is similar to the winch 63, before described, and whereby the rear end of the elevator frame may be elevated with its load.

Pivotally mounted upon the axle, is the load 101, which, in this instance, as shown, is a tilting body, and, as shown, a screw shaft 102, is pivotally engaged on the under side said body and extends into a casing 103, and a levered nut 104, is engaged on said screw shaft to adjust or tilt the load on the axle by rotation of the tailed adjusting nut.

The power vehicle may be of any suitable kind, and when in place, and operatively connected with the tractor, the rear wheels are supported out of driving engagement and the drive from the engine or motor of the motor vehicle is imparted direct to the worm gear drive for the tractor.

The operation is as follows: In coupling up, the automobile is simply backed into place over the elevator sills, as shown in Fig. 2, and the shaft 79, is inserted in the angular socket in the shaft section 77, and also in the angular socket in the shaft socket 74, and the automobile is backed into place until the rear axle is brought over and into position to engage between the brackets 41 and 42, on the elevator sills. The front ends of said elevator sills are now raised and engaged upon the bar 47, by means of the bolt and levered nut 54ª. The winch is now actuated to quickly elevate the rear end of the automobile to the position shown in Figs. 1 and 14, and the clutch member 71, is slipped back out of engagement with the worm 69. In this position, the automobile or vehicle may be utilized in carrying a load, and the platform also may be utilized for that purpose, and if desired, the load may be supported and carried upon the axle, as shown in Fig. 14, or in any suitable manner, to enable the carrying capacity of the tractor and its power vehicle to be attained. In operation, the drive is communicated through the worm 76, and worm gear 10, meshing therewith, thus driving the shaft sections 4 and 5, and thereby through the medium of the pinion 11, driving the gear wheels 15, and thence the annular gear wheel, whether secured in the differential and transmission housing, or whether secured in the tractor wheels, and affording great power owing to the difference in the relative sizes of said pinion and said annular gear wheel. When so supported, the tractor is steered wholly by the front wheels of the power vehicle, which are operated as usual for that purpose from the operator's seat, and by means of the steering wheel or lever.

The engagement between the tractor frame and the elevator frame by means of the ball and socket joint, is such as to afford substantially a three point suspension, enabling the machine to conform to the surface of the ground without bringing undue stress upon any part thereof, and in turning the elevator frames, being engaged at their rear ends on the guide web 28, and having the front end of the tractor frame engaged to the beam 36, by a ball and socket joint, the lateral stress exerted by the wheels in turning serving also to turn the tractor, the differential gears carried on the axle of the tractor permitting the tractor wheels to differentiate in their rotation in making curves or otherwise.

Of course, it is evident that any object capable of being carried upon the axle of the tractor, may be conveniently supported and carried thereon, and that the construction illustrated in Fig. 14 not only illustrates means for balancing the same suitably upon the axle, but as well affords means for adjusting the same thereon to enable the same to be manipulated as desired. It is obvious also that the weight of the load in the power vehicle, if any, acts to increase the tractive efficiency of the tractor, and from the construction described, it is evident that considerable speed may be attained by a device such as described, with very great augmentation of power and tractive effort over that capable of being exerted by the rear wheels of the automobile.

When it is desired to disconnect the power vehicle from the tractor, it is only necessary to drop the rear wheels of said vehicle to the ground by means of the winch, which permits the rear end of the elevator frame to descend to quickly remove the bolts whereby the front end of the tractor sills is engaged upon the bar 47, thence return the clutch member 71, into driving engagement with its worm 69, and the power vehicle may be driven off readily and without inconvenience, leaving the tractor and its frame in position to be again quickly connected with the power vehicle.

If desired, instead of a differential of the type illustrated herein, a differential clutch of any suitable kind may be employed at each of the tractor wheels to enable said wheels to differentiate in their action in turning curves. Details of the construction may, of course, be varied. We have shown but a preferred embodiment of our invention, and it is to be understood that the particular details for engaging the power vehicle in place upon the elevator frame may be varied through a wide range to afford quick engagement with, and quick release from the tractor. We therefore do not purpose limiting the patent granted on this application otherwise than necessitated by the prior art.

We claim as our invention:

1. In a two wheeled tractor, a pair of tractor wheels, an axle connecting, and adapted to drive the same, a tractor frame suspended from the axle and extending forwardly therefrom, a relatively narrow elevator frame pivotally engaged with the forward end of the tractor frame near its middle and extending forwardly therefrom, means for supporting the front end of the elevator frame on the front end of a power vehicle, a winch on the tractor frame for elevating the rear end of the elevator frame and the power vehicle to support the driving wheels of said vehicle out of engagement with the ground, driving connections between the power plant of the power vehicle and said tractor axle to drive the same, and means disconnecting the drive from the power vehicle preliminary to driving the tractor.

2. In a device of the class described a driving axle, tractor wheels, one on each end thereof, an independent speed transmission for each tractor wheel, means on said axle affording differential action of said wheels, a forwardly extending frame on said axle adapted to extend beneath a power vehicle and longitudinally thereof, means on the forward end of said frame for supporting the same at the front axle of the power vehicle, mechanism connected with said frame for elevating the rear end of the power vehicle, an engine on said power vehicle, a shaft extending therefrom to, and operatively connected with the rear axle of the automobile to drive the same, a worm gear on the tractor axle, a worm connected to drive the same, a shaft connected with said worm and adapted for connection with the engine shaft, and means disconnecting said shaft from the rear power vehicle axle whereby the power of said engine is delivered direct to the tractor.

3. A tractor embracing a driving axle, a tractor wheel of large size on each end thereof, independent speed and power transmission gearing for each tractor wheel, a frame supported on the tractor axle and affording means for elevating and supporting the rear end of an automobile thereon, and means affording direct connections between the tractor axle and the power plant of the automobile to drive the tractor wheels therefrom without driving the automobile wheels.

4. A tractor of the class described embracing the driving axle, the tractor wheels of large size secured at each end thereof to be driven thereby, a speed varying gear for each tractor wheel connected with the axle to permit differential action of said tractor wheel, operative connections for driving said tractor from the power plant of an automobile partly supported thereon, a body pivotally mounted upon said axle, and means for swinging said body thereon.

5. In a device of the class described an automobile, a worm gear on the rear driving axle thereof, a worm constantly meshing therewith, an engine, a driving shaft extending axially through the worm and freely rotatable therein, a clutch for mutually engaging said driving shaft and worm to drive said automobile, a tractor embracing tractor wheels of large size, a driving axle therefor, a worm gear carried on the axle, a worm constantly meshing therewith, and a slip shaft adapted to connect the driving shaft with the tractor worm to drive the same and acting when said clutch is released to drive the tractor thereby without driving the automobile axle.

6. A device of the class described embracing an elevator frame adapted to extend beneath, and longitudinally of an automobile, means thereon for engaging and supporting the front end thereof at the front axle, a tractor frame extending beneath the elevator frame and pivotally engaged thereto at the middle thereof, a tractor axle supporting the rear end of the tractor frame, tractor wheels, one on each end thereof, and means connecting the power plant of the automobile with the tractor axle to drive the same independently of the drive for the automobile.

7. In a tractor of the class described, a body pivotally mounted thereon, means for varying the adjustment of said body on said axle, a power vehicle, an elevator frame for supporting the rear end thereof, and power connections between the power vehicle's engine and the tractor axle for driving the latter directly from the former.

8. The combination with a tractor of the class described, of a worm driving gear thereon, an automobile having a worm driving gear on its rear axle, an engine and a shaft releasably engaging the worm of the driving gear, a slip shaft for engaging said shaft with the worm of the tractor, and a clutch for releasing the drive disconnecting the drive from the automobile axle while driving to the tractor axle.

9. In a device of the class described the two wheeled power tractor embracing a forwardly extending tractor frame suspended beneath the axle, an elevator frame pivotally supported near its middle on the forward end of the tractor frame by means affording a ball and socket joint, means on the front end of the elevator frame for supporting the same on the front end of an automobile, means slidably engaging the rear end of the elevator frame with parts on the tractor frame to resist lateral bending of the one with reference to the other, a winch and cable on the tractor frame for elevating the rear end of the elevator frame with the automobile thereon, and a spring affording the connection between said cable and the elevator frame to yieldingly support the same in elevated position.

10. A two wheeled tractor embracing the axle and tractor wheels, and a forwardly extending frame adapted at its forward end to be supported on an automobile, and to support the rear end of the automobile, connections for driving the tractor directly from the power plants of the automobile, a body pivotally supported on the tractor axle, and means for manually adjusting said body with reference to a horizontal plane.

11. In a device of the class described the two wheel tractor, a power vehicle adapted for use in connection therewith and partly supported thereon, a driving gear on the rear automobile axle, operative connections between the same and the engine of the vehicle for driving the vehicle, a clutch for disconnecting the same, and means affording a connection to drive the tractor directly from the power plant when the automobile driving gear is disconnected.

12. In a tractor of the class described a forwardly extending tractor frame, upwardly directed guide webs thereon, an elevator frame pivotally supported near its middle on the forward end of the tractor frame, and guide slots at the rear end of said frame adapted to slidably engage the guide webs on the tractor frame to permit vertical movement of the elevator frame only.

13. In a device of the class described the two piece axle shaft, a bevel gear secured on the adjacent end of each shaft piece, a differential connecting the shaft pieces, and including a worm gear, a plurality of bevel pinions radially journaled therein and in mesh with said bevel gears to drive said shaft pieces when said worm gear is driven, a worm journaled in mesh with said worm gear for driving the same and adapted for connection with the driving shaft of the power vehicle, a pinion on each shaft section, an internal rim gear operatively connected with each tractor wheel, and a plurality of gear wheels in, and meshing with each of said rim gears meshing with said corresponding pinion to drive its tractor wheel therefrom at a reduced rate.

14. A device of the class described comprising a load carrying power truck and the power plant and driving connections therefor, a two wheeled tractor, means on said tractor for supporting the rear end of the power truck with its load thereon, operative connections for driving the tractor wheels directly from said power plant, a body pivoted on the tractor axle, means swingingly adjusting said body, and a spring affording a part of the supporting means for the power truck on said tractor.

15. In a tractor attachment for automobiles, a pair of tractor wheels, a frame connected therewith and adapted to be attached to the front and rear of an automobile, and a worm driving gear connection between the automobile driving gear and the tractor wheels.

16. In a tractor attachment for automobiles, a pair of tractor wheels, a frame therefor adapted to support the rear wheels of an automobile out of driving contact, said frame adapted to be detachably supported by the front end of said automobile, and a worm driving gear connection between the automobile driving gear and the tractor wheels.

17. The combination with a single pair of tractor wheels, of means between said wheels for supporting the rear end of an automobile with its front wheels on the ground, the whole affording a four wheel vehicle, and a worm driving gear connection between the power plant of said automobile and said tractor wheels.

18. The combination with an automobile, of a pair of tractor wheels, a frame supported thereon and affording means to elevate the rear end of the automobile thereon, means on said frame for rigidly engaging the rear axle of the automobile thereto, means supporting the front end of the frame on and securing the same to the front end of the automobile, and a worm driving gear connection between the tractor wheels and the power plant of the automobile.

19. In a tractor attachment for automobiles, a pair of tractor wheels, a frame therefor adapted to support the rear end of an automobile in elevated position, said frame adapted to be detachably supported by the front end of said automobile, and a worm driving gear connection between the automobile driving gear and the tractor wheels.

20. The combination with a motor car, of a tractor frame attachable thereto to utilize the usual front wheels of the motor car for steering, said frame extending beyond the rear end of the motor car, driving wheels mounted on said frame and increasing the wheel base of the assembled frame and motor car, and a worm and gear differential driving connection for said frame driving wheels driven by the power plant of the motor car.

21. The combination with a motor car, of a tractor frame attachable thereto and extending rearwardly of the chassis of the motor car, driving wheels mounted on and supporting the rear end of said frame to increase the wheel base of the combined vehicle and utilizing the front wheels of the motor car for steering, and a worm and gear differential driving mechanism for the driving wheels on said frame connected to be driven from the power plant of the motor car.

22. A construction of the class described, comprising the combination with a motor car, a tractor frame connected to the chassis of the motor car and permitting the front wheels of the motor car to track upon the ground for steering purposes, said frame supporting the rear end of the motor car elevated from the ground, driving wheels mounted at the rear end of said frame rearwardly of the motor car, and worm and gear driving connections between the motor car and said driving wheels on said frame.

23. The combination with a motor car, of a tractor frame, driving wheels mounted thereon whereby the front wheels of the motor car are used for steering and the rear portion of the motor car is supported upon said frame and its driving wheels, and worm gear differential driving connections between the motor car and said driving wheels to said frame.

24. A device for increasing the wheel base of a motor car, comprising a tractor frame attachable to the motor car chassis rearwardly of the front wheels and extending rearwardly of the said chassis, driving wheels mounted on said frame whereby the motor car chassis is supported by the motor car front wheels and the driving wheels of said frame, and worm gear differential driving connections between the power plant of the motor vehicle and the driving wheels of said frame.

25. The combination with a motor vehicle, of a tractor frame connected to the chassis thereof, driving wheels mounted on said frame whereby the chassis of the motor vehicle is supported upon the front wheels of the motor car and upon the driving wheels of said frame to increase the wheel base over that of the motor car alone, and a worm gear differential driving connection between the drive shaft of the motor car and said wheels on said frame.

26. An attachment for increasing the wheel base and carrying capacity of a motor vehicle chassis, comprising a tractor frame connected to the motor vehicle chassis and extending rearwardly thereof, driving wheels mounted on said frame and coacting with the front steering wheels of the motor vehicle to support the assembled construction, and a reduction worm gear driving connection between the power plant of the motor vehicle and said frame driving wheels.

27. An attachment for increasing the wheel base and load capacity of the motor car, comprising a tractor frame attachable to the chassis of the motor car and extending rearwardly thereof, driving wheels mounted on said frame, a worm gear differential mechanism provided therefor, and driving connections between the same and the drive shaft of the motor car.

In testimony whereof we have hereunto subscribed our names in the presence of two subscribing witnesses.

ALBERT E. COOK.
THOMAS VAN TUYL.

Witnesses:
CHARLES W. HILLS, Jr.,
A. B. HILLS.